(12) United States Patent
Oba et al.

(10) Patent No.: US 10,673,357 B2
(45) Date of Patent: Jun. 2, 2020

(54) POWER GENERATION DEVICE

(71) Applicants: OMRON Corporation, Kyoto (JP); THHINK WIRELESS TECHNOLOGIES JAPAN LTD., Kanagawa (JP)

(72) Inventors: Masatoshi Oba, Tokyo (JP); Tomonori Seki, Kusatsu (JP); Naoki Yoshitake, Kusatsu (JP); Yutaka Hattori, Kamakura (JP)

(73) Assignees: OMRON Corporation, Kyoto (JP); THHINK WIRELESS TECHNOLOGIES JAPAN LTD., Kanagawa (JP)

( * ) Notice: Subject to any disclaimer, the term of this patent is extended or adjusted under 35 U.S.C. 154(b) by 432 days.

(21) Appl. No.: 15/574,488

(22) PCT Filed: Aug. 28, 2015

(86) PCT No.: PCT/JP2015/074502
§ 371 (c)(1),
(2) Date: Nov. 16, 2017

(87) PCT Pub. No.: WO2017/037794
PCT Pub. Date: Mar. 9, 2017

(65) Prior Publication Data
US 2018/0152119 A1 May 31, 2018

(51) Int. Cl.
*H02N 1/08* (2006.01)
*H02N 2/18* (2006.01)
*H02N 99/00* (2006.01)

(52) U.S. Cl.
CPC ............... *H02N 1/08* (2013.01); *H02N 2/186* (2013.01); *H02N 99/00* (2013.01)

(58) Field of Classification Search
CPC ........................................................ H02N 1/08
See application file for complete search history.

(56) References Cited

U.S. PATENT DOCUMENTS

2008/0054638 A1* 3/2008 Greene ................... H02J 50/40
290/1 R

FOREIGN PATENT DOCUMENTS

CN 1208284 2/1999
JP S61278785 12/1986
(Continued)

OTHER PUBLICATIONS

"Office Action of Japan Counterpart Application," dated Mar. 20, 2018, with English translation thereof, p. 1-p. 7, in which the listed references were cited.

(Continued)

*Primary Examiner* — Daniel J Cavallari
(74) *Attorney, Agent, or Firm* — JCIPRNET (57) ABSTRACT

A power generation device converts vibrational energy into electric power using a vibrational power generation element in which an electret is provided on one substrate of substrates configured to be relatively movable while maintaining a mutually facing state, and supplies the electric power. A vibrational power generation element has the same configuration as the vibrational power generation element and converts vibrational energy into electric power. The vibrational power generation element is connected to a light-emitting diode via a bridge-type full wave rectifier circuit constituted by diodes, a smoothing circuit constituted by a capacitor, and a light-emitting diode drive circuit. A power generation state of the power generation device using the vibrational power generation element and the like is displayed by blinking of the light-emitting diode.

20 Claims, 4 Drawing Sheets

(56) References Cited

FOREIGN PATENT DOCUMENTS

| | | |
|---|---|---|
| JP | H0191936 | 6/1989 |
| JP | H06165600 | 6/1994 |
| JP | H089555 | 1/1996 |
| JP | H09149554 | 6/1997 |
| JP | H1164546 | 3/1999 |
| JP | H11332127 | 11/1999 |
| JP | 2002062321 | 2/2002 |
| JP | 2002350566 | 12/2002 |
| JP | 2005267420 | 9/2005 |
| JP | 2006101591 | 4/2006 |
| JP | 2010115062 | 5/2010 |
| JP | 2011134862 | 7/2011 |
| JP | 2012210091 | 10/2012 |
| JP | 2013081286 | 5/2013 |
| JP | 2013086552 | 5/2013 |
| JP | 2014023302 | 2/2014 |
| JP | 2014033494 | 2/2014 |
| JP | 2014216545 | 11/2014 |
| WO | 2010150472 | 12/2010 |

OTHER PUBLICATIONS

"International Search Report (Form PCT/ISA/210) of PCT/JP2015/074502", dated Nov. 24, 2015, with English translation thereof, pp. 1-4.
"Written Opinion (Form PCT/ISA/237)", dated Nov. 24, 2015, with English translation thereof, pp. 1-8.
"Office Action of China Counterpart Application," dated Dec. 4, 2018, with English translation thereof, p. 1-p. 12.
"Search Report of Europe Counterpart Application", dated Mar. 20, 2019, p. 1-p. 7.

* cited by examiner

POWER GENERATION DEVICE

CROSS-REFERENCE TO RELATED APPLICATION

This application is a 371 application of the International PCT application serial no. PCT/JP2015/074502, filed on Aug. 28, 2015. The entirety of the above-mentioned patent application is hereby incorporated by reference herein and made a part of this specification.

TECHNICAL FIELD

The present invention relates to a power generation device configured to convert environmental energy such as vibration, heat, light, or electromagnetic waves into electric power.

BACKGROUND ART

Due to recent trends in energy conservation, environmental energy that does not depend on fossil fuels or the like is routinely attracting attention. Energy generated based on sunlight, wind power, or the like is widely known as environmental energy that has become routine. However, in addition thereto, vibrational energy, thermal energy, electromagnetic waves, osmotic pressure, bioenergy, and the like can also be mentioned.

As a power generation device configured to generate electric power using the above-described environmental energy, a power generation device configured to generate electric power by using vibrational energy has been developed (see, for example, Patent Literature 1). As a means for confirming whether or not power generation is being performed in a power generation device using environmental energy, for example, it is conceivable to directly measure an output of a power generation element with a measuring instrument such as a tester or an oscilloscope. In this case, because the output impedance of the power generation element is high, it is necessary to establish a connection via an impedance conversion circuit in order to use a tester or the like (see, for example, Patent Literature 2).

CITATION LIST

Patent Literature

[Patent Literature 1]
Japanese Patent Application Laid-Open (JP-A) No. 2014-23302
[Patent Literature 2]
Japanese Patent Application Laid-Open (JP-A) No. 2014-33494

SUMMARY OF INVENTION

Technical Problem

Because a power generation device configured to generate electric power using environmental energy can be used as a power supply instead of a battery, the use of a power generation device as a power supply of a sensor node of a wireless sensor network is being studied. Sensor nodes in a wireless sensor network may be installed in places or positions that are not easily or frequently accessed by a person, such as, for example, a ship's bottom. However, because it is not easy to bring a measuring instrument as described above to such places or positions, it is not easy to confirm whether or not power generation is actually being performed by the installed power generation device.

The present invention has been made in view of the above-described problems and an objective of the present invention is to provide a power generation device using environmental energy in which the power generation state may be confirmed easily.

Solution to Problem

In the present invention, a configuration provided with a display element configured to display a power generation state of a power generation device using environmental energy is adopted to solve the above-described problems. At this time, it is possible to easily confirm a power generation state of the power generation element through the display element.

In detail, the present invention is a power generation device for outputting environmental energy as electric power, the power generation device including: a first power generation element configured to convert environmental energy and generate electric power to be supplied to a load other than the power generation device; a display element configured to display a power generation state of the power generation device; and a second power generation element configured to convert environmental energy into electric power and supply the electric power to the display element, wherein the second power generation element is placed under the same environment as a power generation environment of the first power generation element and electrically separated from the first power generation element. According to the present invention, it is possible to easily confirm the power generation state of the power generation device through the display element.

The power generation device according to the present invention supplies electric power to various loads other than the power generation device through the first power generation element configured to convert environmental energy into electric power and similarly supplies electric power to the display element through the second power generation element configured to convert environmental energy into electric power. Because the first power generation element and the second power generation element are electrically separated, the electric power supplied to the load by the power generation device is not affected by power consumption of the display element. Even if there is little electric power generated by the first power generation element, it is possible to display a power generation state through the display element. It is only necessary for the load to receive the supply of electric power generated by the power generation device. The load may be present in the same housing as the power generation device or may be provided separately from the power generation device.

Here, the power generation state is not limited to whether or not the power generation device is generating electric power and includes various states such as whether or not predetermined conditions that the power generation voltage is greater or less than a predetermined value or the like are satisfied. Also, although there may be a light-emitting element such as a light-emitting diode (LED) as a display element, the display element is not limited thereto. Also, as long as the display element is a light-emitting element, the display method of the display element is not limited to a case in which the light-emitting element is turned on or off and displayed and the light-emitting element may blink in a predetermined cycle. Also, a blinking cycle or light emission intensity may be changed by a power generation voltage to display a magnitude of the power generation voltage. A plurality of light-emitting elements having different luminescent colors may be used to display a power generation voltage or the like according to a luminescent color or a plurality of light-emitting elements may be used to display a power generation voltage or the like according to the number of light-emitting elements to be turned on.

Also, the second power generation element is placed in the same environment as the power generation environment of the first power generation element. Because the display element receives electric power supplied from the second power generation element, the power generation state displayed by the display element is directly the power generation state of the second power generation element. However, because the power generation environment in which the second power generation element is placed is the same as the power generation environment of the first power generation element, the display element can display the power generation state of the first power generation element, that is, the power generation state of the power generation device. Here, the power generation environment means action states of environmental energy for the first power generation element and the second power generation element. If the environmental energy is vibrational energy, the power generation environment is the action state of vibration for each power generation element. If the environmental energy is thermal energy, the power generation environment is the action state of heat to each power generation element. According to a type of environmental energy, there may be various specific configurations for implementing the same power generation environment.

Also, the environmental energy includes vibration, heat, light, electromagnetic waves, and the like, but is not limited thereto.

Also, a switching circuit configured to switch between a circuit for supplying the electric power generated by the second power generation element to the display element and a circuit for supplying the electric power to the load may be configured to be provided. By providing such a switching circuit, if it is not necessary to drive the display element, it is possible to supply the electric power generated by the second power generation element to the load and to effectively utilize the generated power.

Also, the power generation device may be a power generation device for supplying electric power to a device configured to perform a predetermined operation as the load and the power generation device may be configured to include a reset signal output circuit configured to output a reset signal for resetting the predetermined operation of the device to the device if a power generation voltage from the second power generation element is less than a predetermined value. The reset signal output circuit may receive electric power supplied from the second power generation element or may receive electric power supplied from the first power generation element.

There are various types of device configured to receive electric power supplied from the power generation device as the load. Such devices include digital devices such as digital wireless devices for transmitting information detected by a sensor or for receiving control signals from the outside. Because environmental energy is not always supplied continuously with constant strength, the generated voltage may fluctuate or suddenly drop. For this reason, there is a possibility that the power generation voltage of the power generation device may suddenly drop while the digital wireless device is performing a predetermined operation such as data transmission/reception and then an abnormality may occur in the operation of the digital wireless device when the supply of environmental energy is resumed and electric power is supplied from the power generation device. However, if such a digital wireless device is installed in a place or a position that is not easily or frequently accessed by a person, it is difficult for a person to perform maintenance such as repair every time an abnormality occurs. If a reset signal for resetting a predetermined operation of the device is output when the power generation voltage from the second power generation element is less than a predetermined value as in the present invention, a system reset on the software of the device becomes possible and it is possible to prevent an operation abnormality of the device from occurring. It is only necessary for the reset signal to cause the device receiving the reset signal to transition to an original state before a predetermined operation or a specific state defined in correspondence with an input of the reset signal. If the operation of the device is enabled by resuming the supply of electric power, there is no need for a person to access the device each time and the maintainability is improved. Although the predetermined operation of the device includes a series of processes to be performed in accordance with a purpose such as control of specific functions to be implemented by the device, information processing inside the device, or the like, the present invention is not limited thereto.

Also, the first power generation element and the second power generation element may be configured to be provided in the same housing. By providing the first power generation element and the second power generation element in the same housing, it is possible to place the second power generation element in the same environment as the power generation environment of the first power generation element. That is, the influences of the environmental energy on the first power generation element and the second power generation element can be the same or approximately resembling. If the environmental energy is vibration, the influence of vibration on each power generation element is made the same or approximately resembling by fixing fixed side parts of the first power generation element and the second power generation element to the same constituent material of the housing. In this case, the present invention is not necessarily limited to the case in which the fixed side parts are fixed to the same constituent material of the housing, and the fixed side parts may be fixed to different constituent materials which are in the same or an approximating vibration state.

Also, the first power generation element and the second power generation element may be the same type of power generation element. The same type of power generation element is a power generation element adopting the same or an approximating configuration and having the same or similar output characteristics with respect to the supplied environmental energy. Because the same or similar output with respect to the environmental energy can be obtained by using the same type of power generation element for the first power generation element and the second power generation element, the power generation state displayed by the display element to which electric power is supplied from the second power generation element more faithfully reflects the power generation state of the first power generation element.

Also, the first power generation element and the second power generation element may be vibrational power generation elements that convert vibrational energy into electric power or thermal power generation elements that convert thermal energy into electric power. The first power generation element and the second power generation element are not limited thereto as long as they are elements that convert environmental energy into electric power.

Advantageous Effects of Invention

In a power generation device using environmental energy, it is possible to easily confirm whether or not power generation is being performed.

DESCRIPTION OF PREFERRED EMBODIMENTS

Hereinafter, a vibrational power generation device 1 of the present invention will be described with reference to the drawings. Also, the configuration of the following embodiment is an example, and the present invention is not limited to the configuration of this embodiment.

Embodiment 1

Figure 1:
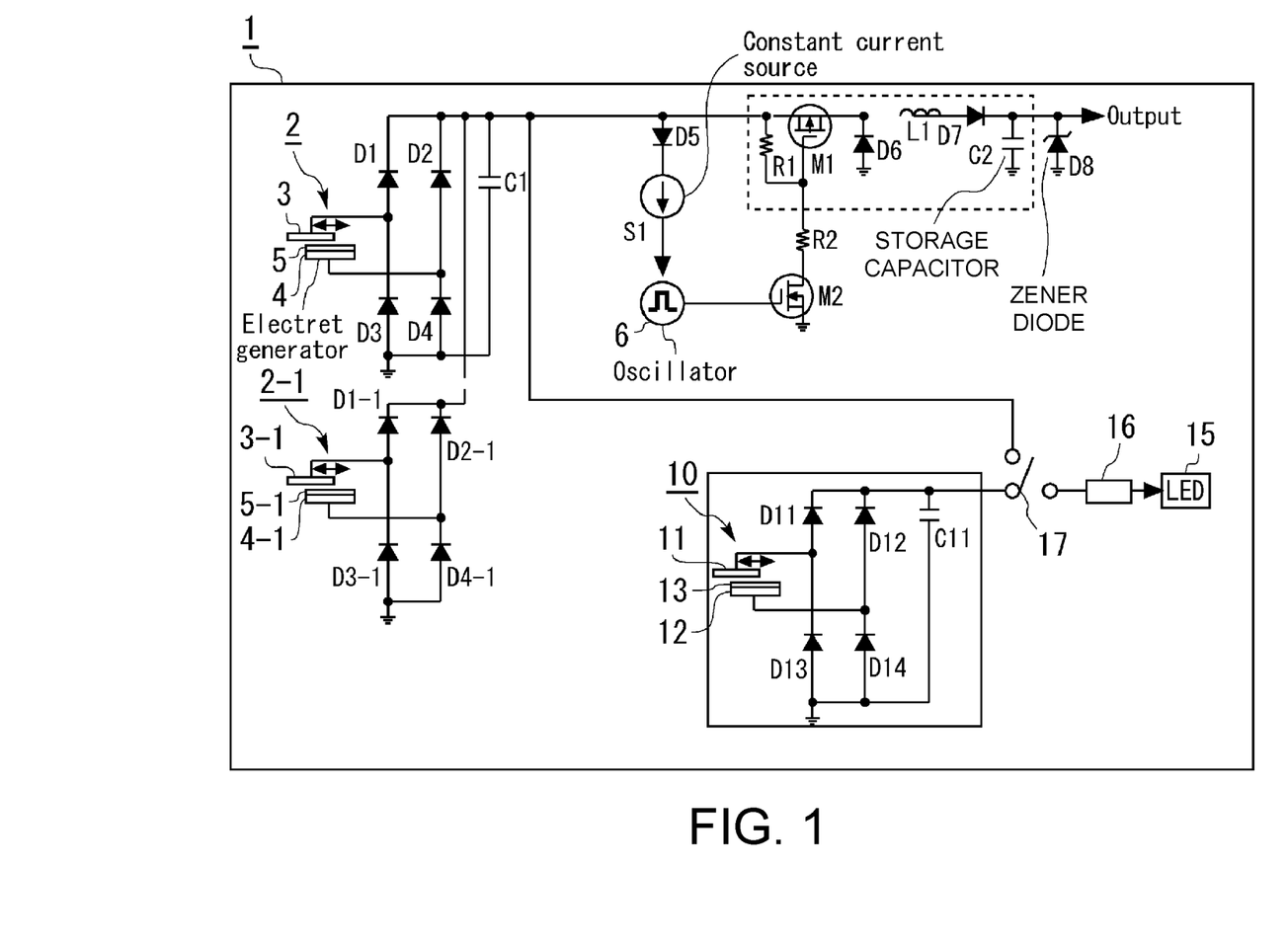
FIG. 1 is a diagram illustrating a schematic configuration of a power generation device according to Embodiment 1 of the present invention.

FIG. 1 illustrates a schematic configuration of the power generation device 1 according to the present invention. As the vibrational power generation element 2, for example, there is a vibrational power generation element 2 in which an electret 5 is provided on one substrate 4 of substrates 3 and 4 configured to be relatively movable while maintaining a mutually facing state. Because the principle of power generation by the action of the electret 5 is conventional technology, detailed description thereof will be omitted in the present description.

The power generation element used in the power generation device according to the present invention is not limited to the above-described power generation element. The power generation element may be a power generation element using vibrational energy in a different scheme or a power generation element using another environmental energy such as heat, light, or electromagnetic waves other than vibration.

The substrate 3 of the vibrational power generation element 2 is connected to an anode of a diode D1 and a cathode of a diode D3. The substrate 4 is connected to an anode of a diode D2 and a cathode of a diode D4. Cathodes of the diode D1 and the diode D2 are connected to one end of a capacitor C1. Anodes of the diode D3 and the diode D4 are connected to the other end of the capacitor C1 and also connected to a second output terminal (ground). The diodes D1, D2, D3, and D4 constitute a bridge-type full wave rectifier circuit for the output of the vibrational power generation element 2 and the capacitor C1 constitutes a smoothing circuit for an output of the bridge-type full wave rectifier circuit.

The cathodes of the diodes D1 and D2 and one end of the capacitor C1 are connected to the anode of the diode D5. The cathode of the diode D5 is connected to one end of the constant current source S1. The constant current source S1 supplies a constant current to an oscillator 6. The output of the oscillator is connected to a gate of an N-channel MOSFET (M2). A source of the MOSFET (M2) is connected to the second output terminal and a drain thereof is connected to one end of a resistor R2. The other end of the resistor R2 is connected to one end of a resistor R1 and a gate of a P-channel MOSFET (M1). A diode D5, the constant current source S1, the oscillator 6, the MOSFET (M2), and the resistor R2 constitute a control circuit of a switching regulator to be described below.

The cathodes of the diodes D1 and D2, one end of the capacitor C1, and the anode of the diode D5 are connected to the other end of the resistor R1 and the source of the MOSFET (M1). A drain of the MOSFET (M1) is connected to a cathode of a diode D6 and one end of an inductor L1. An anode of the diode D6 is connected to the second output terminal. The other end of the inductor L1 is connected to an anode of a diode D7. A cathode of the diode D7 is connected to one end of a storage capacitor C2, a cathode of a Zener diode D8, and a first output terminal. The other end of the storage capacitor C2 is connected to the second output terminal. The switching regulator includes the resistor R1, the MOSFET (M1), the diode D1, the inductor L1, the diode D7, and the storage capacitor C2.

An anode of a Zener diode D8 is connected to the second output terminal. The voltage of the first output terminal is held by the Zener diode D8 such that it is constant.

Because an operation and a function of a circuit provided at a stage subsequent to such a vibrational power generation element 2 is conventional technology, detailed description thereof will be omitted in the present description, but it is possible to lower output impedance to about 100 kΩ and connect an appropriate load through such a circuit.

A vibrational power generation element 2-1 is obtained by providing an electret 5-1 on one substrate 4-1 of substrates 3-1 and 4-1 configured to be relatively movable while maintaining a mutually facing state. The substrate 3-1 is connected to cathodes of a diode D1-1 and a diode D3-1. The substrate 4-1 is connected to an anode of a diode D2-1 and a cathode of a diode D4-1. The cathodes of the diodes D1-1 and D2-1 are connected to one end of the capacitor C1. The diode D3-1 and the diode D4-1 are connected to the second output terminal.

Here, the vibrational power generation element 2 and the vibrational power generation element 2-1 correspond to a first power generation element. These two vibrational power generation elements are connected in parallel, but it goes without saying that vibrational power generation elements may be used singly or three or more vibration generation elements may be connected in parallel and used. Also, it is preferable to use the same type of vibrational power generation element for a plurality of vibrational power generation elements.

A power generation device using this vibrational power generation element is an example of a power generation device that converts environmental energy to generate electric power. In accordance with the load that receives the supply of electric power generated by the power generation device, a circuit having an appropriate function can be provided at a stage subsequent to the vibrational power generation element.

Further, the present invention includes a vibrational power generation element 10. In the vibrational power generation element 10, an electret 13 is provided on one substrate 12 of substrates 11 and 12 which are configured to be relatively movable while maintaining a mutually facing state. Because the principle of power generation of the vibrational power generation element 10 is conventional technology, detailed description thereof will be omitted in the present description.

The substrate 11 is connected to an anode of a diode D11 and a cathode of a diode D13. The substrate 12 is connected to an anode of a diode D12 and a cathode of a diode D14. A cathode of the diode D11 and a cathode of the diode D12 are connected to one end of the capacitor C11. The cathodes of the diode D13 and the diode D14 are connected to the second output terminal and the other end of the capacitor C11. The diodes D11, D12, D13, and D14 constitute a full wave rectifier circuit for the output of the vibrational power generation element 10. Also, the capacitor C11 constitutes a smoothing circuit for the output of the full wave rectifier circuit. One end of the capacitor C11 is connected to an LED drive circuit 16 for driving an LED 15. Further, a switching circuit 17 for connecting and disconnecting one end of the capacitor C11 and one end of the capacitor C1 is provided. Although a high-insulation MEMS switch or the like can be used for this switching circuit, the present invention is not limited thereto.

The vibrational power generation element 10 corresponds to a second power generation element, and the LED 15 corresponds to a display element. By connecting the LED 15 to the output of the vibrational power generation element 10 as described above, the electric power generated by the vibrational power generation element 10 is supplied to the LED 15 and turns on the LED 15. That is, it can be confirmed whether or not vibrational energy is supplied to the vibrational power generation device and the vibrational power generation element 2 and the vibrational power generation element 2-1 are generating electric power through blinking of the LED 15 connected to the output of the vibrational power generation element 10 to which the vibrational energy is similarly supplied. Also, when the switching circuit 17 is provided and the switch is connected to the LED drive circuit 16 side, the electric power generated by the vibrational power generation element 10 is supplied to the LED 15 via the LED drive circuit 16. When the switching circuit 17 is connected to the vibrational power generation element 2 side, the vibrational power generation element 10 is connected to the load in parallel to the vibrational power generation element 2, and the electric power generated by the vibrational power generation element 10 is supplied to the load. By switching the circuit to which electric power is supplied from the vibrational power generation element 10 by the switching circuit 17 as described above, it is possible to effectively utilize the electric power generated by the vibrational power generation element 10. Although the switching circuit 17 is provided in the present embodiment, a circuit for supplying electric power from the vibrational power generation element 10 to the LED 15 and a circuit for supplying electric power from the vibrational power generation element 2 and the vibrational power generation element 2-1 to the load may be electrically completely separated so that they are not electrically connected to each other without providing the switching circuit.

The vibrational power generation element 2, the vibrational power generation element 2-1, and the vibrational power generation element 10 are provided in the same housing of the power generation device. By providing these vibrational power generation elements in the same housing, environmental energy (vibration here) acts on each vibrational power generation element via a common housing. That is, the vibrational power generation element 10 configured to supply power to the LED 15 is placed in the same vibration state as those of the vibrational power generation element 2 and the vibrational power generation element 2-1 or a state approximating thereto, that is, under the same power generation environment as those thereof. Therefore, the LED 15 can more faithfully display the power generation state of the power generation device configured to generate electric power through the vibrational power generation element 2 and the like.

The same type of vibrational power generation element can be used for the vibrational power generation element 2 for extracting electric power and the vibrational power generation element 10 for turning on the LED. When the same type of vibrational power generation element is used as described above, it is possible to faithfully reflect the operation state of the vibrational power generation element configured to extract electric power on an operation of turning on the LED because the LED is turned on by the vibrational power generation element configured to operate like the vibrational power generation element for extracting electric power. However, in order to confirm whether or not environmental energy used for power generation is being supplied like whether or not vibration is occurring, it is not always necessary to use the same type of power generation element as the vibrational power generation element for extracting electric power as a vibrational power generation element for turning on the LED.

Figure 2:
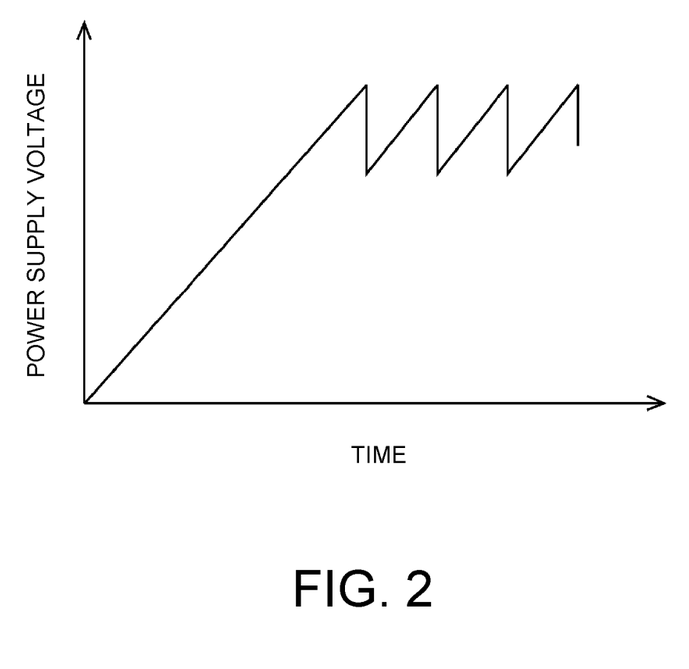
FIG. 2 is a view illustrating an output voltage waveform of a vibrational power generation element.

FIG. 2 illustrates an output voltage waveform of the vibrational power generation element 10 appearing across the capacitor C11. The capacitor C11 performs charging and discharging due to relative movement between the substrates 11 and 12 of the vibrational power generation element 10 caused by vibration. As illustrated in FIG. 2, a voltage appearing across the capacitor C11 increases due to the charging of the capacitor C11 and the voltage appearing across the capacitor C11 decreases due to the discharging of the capacitor C11. Thereafter, as the capacitor C11 is repeatedly charged and discharged, the voltage appearing across the capacitor C11 also increases and decreases repeatedly. The change in the output voltage shown here is an example, and the output voltage waveform appearing across the capacitor C11 is different due to vibration with respect to the vibrational power generation element 10.

Figure 3:
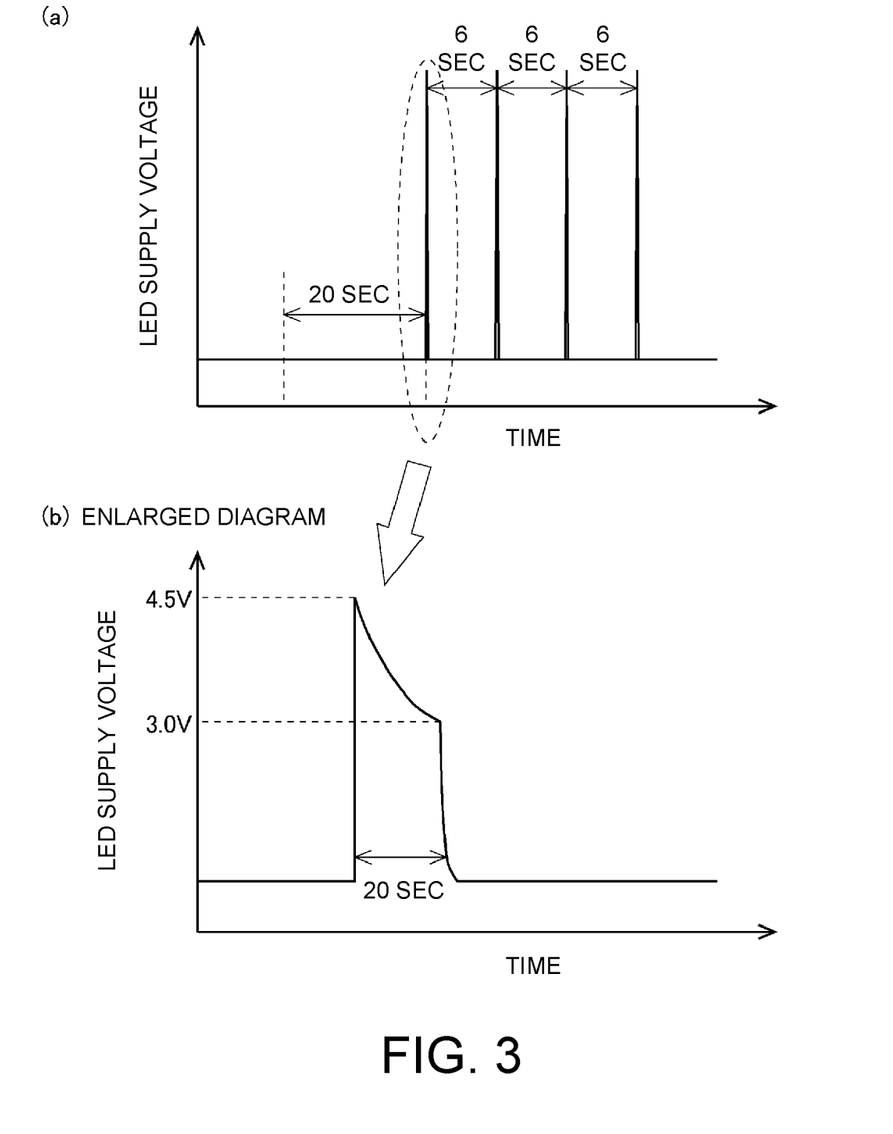
FIG. 3 is a diagram illustrating a voltage waveform for driving an LED.

The LED drive circuit 16 is a circuit configured to generate a drive voltage of the LED 15. The LED drive circuit 16 can adopt various configurations in accordance with specifications of the LEDs 15 and blinking methods as a display method of the power generation state of the power generation device. FIG. 3 illustrates an example of a drive voltage waveform of the LED 15. Here, the vibrational power generation element 10 is vibrated at a constant acceleration and a constant cycle (for example, 0.15 G and 30 Hz) and driven so that electric power is supplied to the LED 15 when the output voltage via the capacitor C11 of the vibrational power generation element 10 exceeds 4.5 V, and the supply of electric power to the LED 15 is stopped when the output voltage is less than 3.0 V. If such drive conditions are set, the voltage supplied to the LED 15 changes such that a pulse continuously rises, for example, at intervals of 6 seconds after 20 seconds of excitation (see (a) of FIG. 3). Here, as illustrated in (b) of FIG. 3, a voltage with a pulse width of 20 msec is supplied to the LED 15.

Because a specific configuration of the LED drive circuit 16 is conventional technology, the specific configuration will not be described in detail in the present description. As the LED drive circuit 16, for example, there is an LED drive circuit configured to switch a circuit that supplies electric power from the vibrational power generation element 10 to the LED 15 through a MOSFET. A source of the MOSFET is connected to an output side of the vibrational power generation element 10, a drain thereof is connected to the LED 15 side, and a gate thereof is connected to an output terminal of an RS flip-flop. An output terminal of a first comparator is connected to an S terminal of the RS flip-flop and an output terminal of a second comparator is inverted and connected to an R terminal. A voltage of 4.0 V is applied as a first reference voltage to an inverting input terminal of the first comparator and an output voltage of the vibrational power generation element 10 is applied to a non-inverting input terminal thereof. Also, a voltage of 3.0 V is applied as a second reference voltage to an inverting input terminal of the second comparator, and an output voltage of the vibrational power generation element is applied to a non-inverting input terminal thereof. If the LED drive circuit 16 is configured as described above, the LED drive circuit 16 can be driven so that electric power is supplied to the LED 15 when the output voltage of the vibrational power generation element 10 increases and exceeds the first reference voltage and the supply of electric power to the LED is stopped when the output voltage decreases and is less than the second reference voltage. Of course, the LED drive circuit 16 may be configured to include an appropriate circuit such as a step-down circuit as provided in the vibrational power generation element 2 in accordance with specifications of the vibrational power generation element 10 and the LED 15. Also, if specific driving control is not performed on the LED 15, the LED drive circuit may perform only step-down or the like.

Embodiment 2

Figure 4:
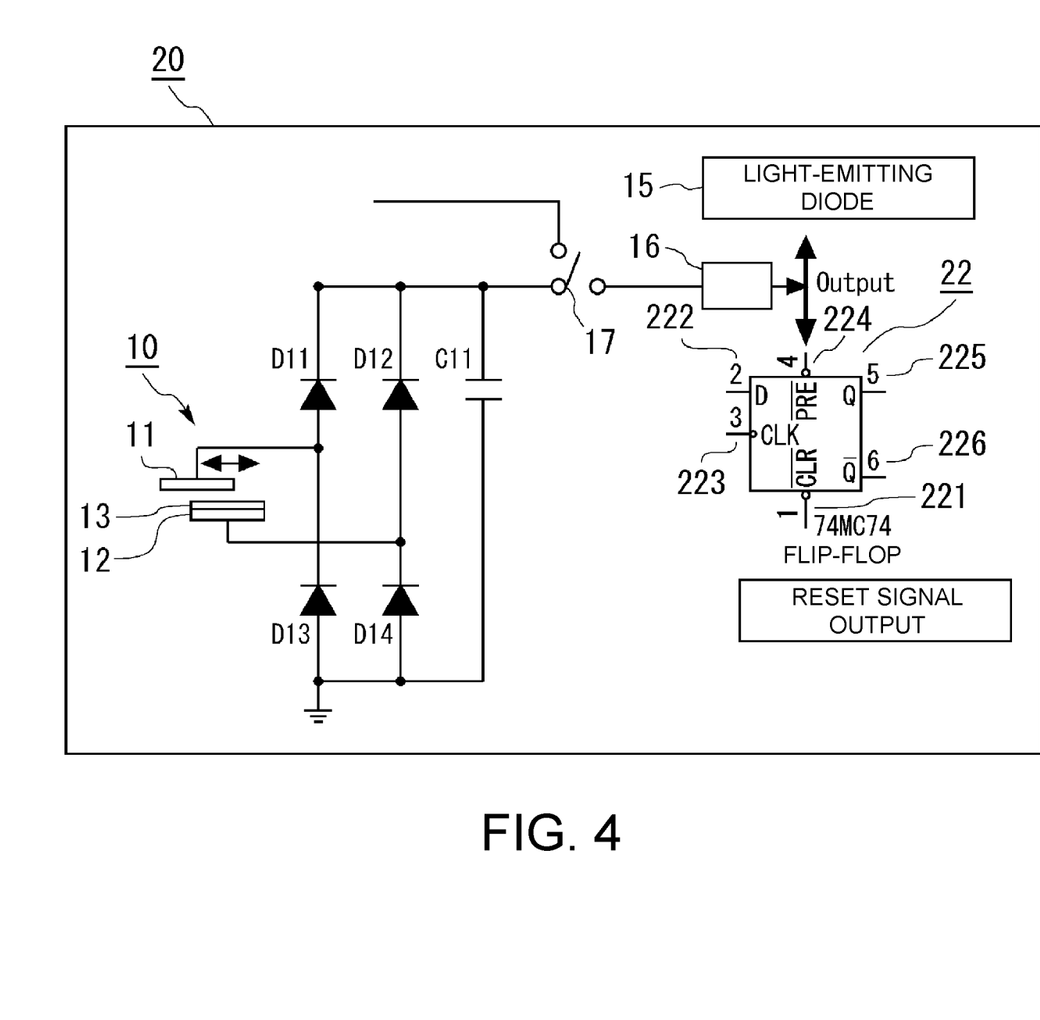
FIG. 4 is a diagram illustrating a schematic configuration of a power generation device according to Embodiment 2 of the present invention.

FIG. 4 illustrates a schematic configuration of a vibrational power generation device 20 according to the present invention. Although not illustrated, the configuration of the vibrational power generation element or the like that supplies electric power to the load is similar to that of Embodiment 1. Also, the same reference signs are used for components the same as those in Embodiment 1, and detailed description thereof will be omitted.

The vibration power generation device 20 has a vibrational power generation element 10 connected to an LED. Because the full wave rectifier circuit including the vibrational power generation element 10 and the diodes D11 to D14 and the smoothing circuit of the capacitor C11 are similar to those in Embodiment 1, similar reference signs are used and description thereof will be omitted.

One end of the capacitor C11 is connected to an input terminal of the LED drive circuit 16 via the switching circuit 17, and an anode of the LED 15 and a preset terminal 224 of a flip-flop 22 are connected to an output terminal of the LED drive circuit 16. Although not illustrated, the flip-flop 22 receives electric power supplied from the vibrational power generation element 10. Although the switching circuit 17 is provided in the present embodiment, a circuit for supplying power from the vibrational power generation element 10 to the LED 15 and a circuit for supplying electric power from the vibrational power generation element 2 and the vibrational power generation element 2-1 to the load can be configured to be electrically completely separated and electrically disconnected from each other without providing the switching circuit.

In this manner, the electric power generated by the vibrational power generation element 10 is supplied to the LED 15 and the LED 15 is turned on as in Embodiment 1. That is, likewise, it is possible to confirm whether or not vibrational energy is supplied to the power generation device and the vibrational power generation element 2 and the vibrational power generation element 2-1 are generating electric power through blinking of the LED 15 connected to the output of the vibrational power generation element 10 to which vibrational energy is supplied. Also, because the vibrational power generation element 10 is provided in the same housing as those of the vibrational power generation element 2 and the vibrational power generation element 2-1 and is placed under the same power generation environment as those of the vibrational power generation element 2 and the vibrational power generation element 2-1, the LED 15 can more faithfully display the powergeneration state of the power generation device configured to generate electric power through the vibrational power generation element 2 or the like.

As the flip-flop, for example, a D flip-flop 22 having terminals 221-226 can be used. Because the operation of the D flip-flop 22 is conventional technology, detailed description thereof will be omitted in the present description. Here, when the voltage appearing across the capacitor C11 falls below 3.0 V (a predetermined value), the output voltage of the LED drive circuit 16, that is, an input signal to the preset terminal 224 of the flip-flop 22, falls, whereby an output of a terminal 225 of the flip-flop 22 becomes "High" regardless of a value of the signal input to the D terminal 222 of the flip-flop 22. When a connection to the terminal 226 is established in accordance with the specification of a connection destination of the output of the flip-flop 22, it is possible to output "Low" due to the falling of the input signal to the preset terminal 224. The flip-flop 22 corresponds to a reset signal output circuit.

By using this Hi or Low output signal as a signal for resetting the system on the software in a device such as a digital wireless device or the like, a predetermined operation such as transmission/reception of data is automatically reset if the voltage of the power generation device is lowered, an abnormality of the device is prevented when the supply of electric power is resumed, and maintainability is improved.

Although the reset signal output circuit is constituted of a D flip-flop in the present embodiment, the present invention is not limited to such a configuration. It is possible to adopt a configuration of a device configured to receive electric power supplied from the power generation device 20 as the load or an appropriate reset signal output circuit based on a signal output as a reset signal.

What is claimed is:
1. A power generation device for outputting environmental energy as electric power, the power generation device comprising:
a first power generation element configured to convert the environmental energy and generate electric power to be supplied to a load other than the power generation device;
a display element configured to display a power generation state of the power generation device; and
a second power generation element configured to convert the environmental energy into electric power and supply the electric power generated by the second power generation element to the display element,
wherein the second power generation element is placed under a same environment as a power generation environment of the first power generation element and electrically separated from the first power generation element.

2. The power generation device according to claim 1, comprising:
a switching circuit configured to switch between a circuit for supplying the electric power generated by the second power generation element to the display element and a circuit for supplying the electric power generated by the second power generation element to the load.

3. The power generation device according to claim 1, wherein the power generation device is a power generation device for supplying electric power to a device configured to perform a predetermined operation as the load, and
wherein the power generation device comprises a reset signal output circuit configured to output a reset signal for resetting the predetermined operation of the device to the device if a power generation voltage from the second power generation element is less than a predetermined value.

4. The power generation device according to claim 1, wherein the first power generation element and the second power generation element are provided in a same housing.

5. The power generation device according to claim 1, wherein the first power generation element and the second power generation element are a same type of power generation element.

6. The power generation device according to claim 1, wherein the first power generation element and the second power generation element are vibrational power generation elements configured to convert vibrational energy into electric power.

7. The power generation device according to claim 1, wherein the first power generation element and the second power generation element are thermal power generation elements configured to convert thermal energy into electric power.

8. The power generation device according to claim 2, wherein the power generation device is a power generation device for supplying electric power to a device configured to perform a predetermined operation as the load, and wherein the power generation device comprises a reset signal output circuit configured to output a reset signal for resetting the predetermined operation of the device to the device if a power generation voltage from the second power generation element is less than a predetermined value.

9. The power generation device according to claim 2, wherein the first power generation element and the second power generation element are provided in a same housing.

10. The power generation device according to claim 3, wherein the first power generation element and the second power generation element are provided in a same housing.

11. The power generation device according to claim 2, wherein the first power generation element and the second power generation element are a same type of power generation element.

12. The power generation device according to claim 3, wherein the first power generation element and the second power generation element are a same type of power generation element.

13. The power generation device according to claim 4, wherein the first power generation element and the second power generation element are a same type of power generation element.

14. The power generation device according to claim 2, wherein the first power generation element and the second power generation element are vibrational power generation elements configured to convert vibrational energy into electric power.

15. The power generation device according to claim 3, wherein the first power generation element and the second power generation element are vibrational power generation elements configured to convert vibrational energy into electric power.

16. The power generation device according to claim 4, wherein the first power generation element and the second power generation element are vibrational power generation elements configured to convert vibrational energy into electric power.

17. The power generation device according to claim 5, wherein the first power generation element and the second power generation element are vibrational power generation elements configured to convert vibrational energy into electric power.

18. The power generation device according to claim 2, wherein the first power generation element and the second power generation element are thermal power generation elements configured to convert thermal energy into electric power.

19. The power generation device according to claim 3, wherein the first power generation element and the second power generation element are thermal power generating elements configured to convert thermal energy into electric power.

20. The power generation device according to claim 4, wherein the first power generation element and the second power generation element are thermal power generation elements configured to convert thermal energy into electric power.

* * * * *